United States Patent [19]

Speekman

[11] 3,803,339
[45] Apr. 9, 1974

[54] LONGITUDINALLY WATERTIGHT CABLE
[75] Inventor: Bernardus Willebrordus Speekman, Venlo, Netherlands
[73] Assignee: U.S. Philips Corporation, New York, N.Y.
[22] Filed: Dec. 14, 1972
[21] Appl. No.: 315,098

[30] Foreign Application Priority Data
Dec. 17, 1971 Netherlands.................... 7117321

[52] U.S. Cl.................. 174/23 C, 106/33, 174/116, 252/72
[51] Int. Cl......................................... H02g 15/00
[58] Field of Search...... 174/23 R, 23 C, 116, 25 C; 252/72; 106/33

[56] References Cited
UNITED STATES PATENTS
2,507,508  5/1950  Elliott et al. .................. 174/23 C X
3,347,974  10/1967  Arendt et al. .................... 174/23 R
3,538,235  11/1970  Arendt et al. .................... 174/23 C FOREIGN PATENTS OR APPLICATIONS
1,465,991  5/1969  Germany......................... 174/23 C
1,540,407  1/1970  Germany......................... 174/23 C Primary Examiner—Bernard A. Gilheany
Assistant Examiner—A. T. Grimley
Attorney, Agent, or Firm—Norman N. Spain; Frank R. Trifari

[57] ABSTRACT

A cable self-sealing upon penetration by water which cable comprises a material which seals off water penetration forms a gas and swells when in contact with water. Such a material consists of a mixture of an organic high polymeric material swelling when in contact with water and a mixture of materials which do not react in a dry state but react when in contact with water while forming a noninflammable gas, for example, a mixture of calcium carbonate and citric acid.

4 Claims, 1 Drawing Figure

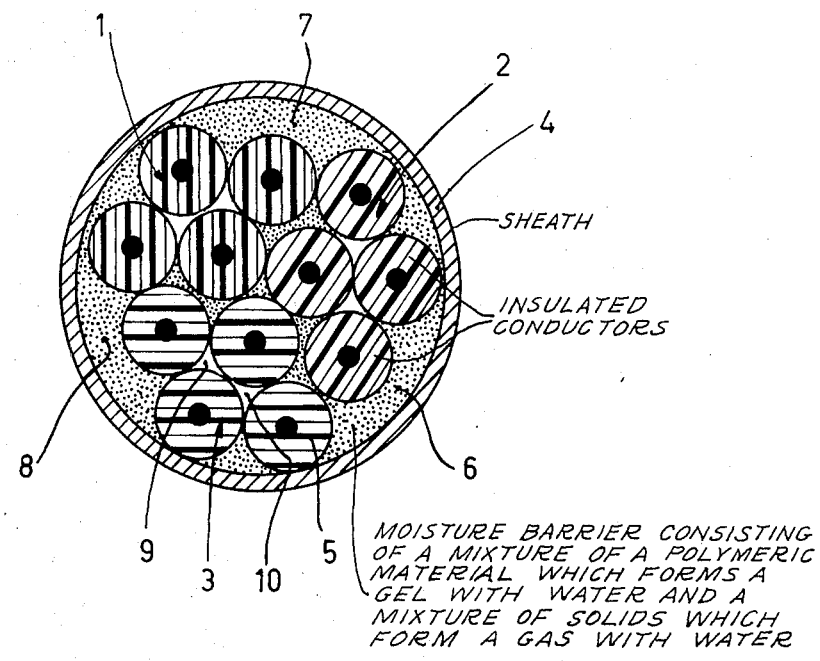

LONGITUDINALLY WATERTIGHT CABLE

The invention relates to a cable which is self-sealing upon penetration by water. The cable comprises one or more insulated conductors cated within a sheath, and a material which swells and evolves a gas when in contact with water.

Cables which over their entire length or at regular distances accommodate a material swelling and/or evolving a gas when in contact with water are known as such. Cables which must be particularly protected from penetration by water over large lengths are buried cables for telecommunication purposes. Excavations in their vicinity or other causes regularly expose cables of this kind to mechanical violence which may locally cause damage of the cable sheath in such a manner that water may penetrate the cable. This sometimes becomes apparent in the electrical behaviour of the cable only after water has penetrated the cable over relatively large lengths, sometimes over 100 metres or more. In that case long cable lengths have to be replaced.

It is therefore proposed to provide a material in cables, particularly also telecommunication cables, which swells in contact with water such as an organic high polymeric material thus forming a gel with water.

Materials suitable for this purpose are, for example, polyvinyl alcohol, dextrine, starch, cellulose derivatives such as methoxy-cellulose and alignates.

These materials may be provided over the entire length or at regular distances over a given length of the cable. For this purpose a quantity of the material capable of swelling in contact with water is provided in the form of a powder during cable manufacture at regular distances in the cable, in telecommunication cables preferably in the spaces between the wire pairs or wire quads. Subsequently the cable sheath is provided. In this method the mechanical and electrical properties of the cable are influenced as little as possible by the presence of the pulverulent material capable of swelling, while observation of the cable by means of gas pressure remains possible. When a leakage occurs and when water penetrates, the material constitutes a gel with water while it swells and penetrates also the wires in the pairs and quads and prevents further water penetration or at least causes this penetration to proceed much more slowly.

Generally materials are used as gas-evolving materials which react with water while forming a gas. Carbides and hydrides, for example, of calcium have been proposed for this purpose. A drawback of these materials is that inflammable gases such as acetylene and hydrogen are evolved when water penetrates. This may be troublesome in case of repairs. A further drawback of these materials is that a reaction takes place even in moist air, which may yield difficulties in the cable and when storing it. In the finished cable the gas evolving material may gradually lose its activity by in building up a gas pressure to counteract the penetration by water-vapor, because most materials used for cable sheaths are not absolutely water vapour-tight.

It has been proposed to provide a material in cables, which material swells in water and evolves a gas without stating which advantages are to be expected of such a combined action. The described drawbacks occur when using the carbides referred to in this connection. When using, for example, a combination of a carbide and cellulose, gas may be formed in moist air while the material is pressed between the wires. The material thus does not only become inactive in the long run but it may be expected that also the electrical properties of the cable will be modified without an actual leakage having occurred.

An object of the invention is to obviate the described drawbacks in a longitudinally watertight cable.

This object is satisfied by a cable which is characterized in that the material self-sealing upon penetration by water consists of a mixture of a high polymeric organic material which forms a gel with water and at least two non-hygroscopic materials at least one of which is soluble in water and which do not react in a dry condition but react in contact with water while forming a non-inflammable gas.

When water penetrates a cable according to the invention, at least one of the gas-forming materials therein dissolves and as a result of a chemical reaction a gas is formed which presses the swelling polymeric material into all ducts present, also between the wires in the wire pairs and quards.

Suitable for the envisaged purpose are combinations of materials which do not react in a dry condition, for example, combinations of non-hydrogscopic solid acids and salts of weak acids, the anhydrides of which latter acids are volatile and which combination in contact with water form an uninflammable gas by chemical reaction while at least one of the materials present in the combination dissolves.

Examples of suitable acids are, inter alia, citric acid, oxalic acid, aminosulphonic acid, succinic acid, glutaric acid, maleic acid, benzoic acid. Examples of suitable salts are the carbonates, sulphites and nitrites. A suitable combination consists of, for example, a mixture of citric acid and calcium carbonate in approximately stoichiometric quantities.

All previously mentioned and proposed high polymeric materials for the formation of water barriers by constituting a gel with water are suitable as high polymeric materials for the envisaged object. Particularly satisfactory results were obtained with a methoxy-cellulose which is marketed under the name of Tylose 444 (a product from Kalle AG). Other examples are inorganic materials such as bentonite clays, polyvinyl alcohol, methyl cellulose, cellulose acetate, proteins such as gelatine, casein glu Irish Moss, pectin, soluble starches, dried kelp, mucilage and natural gums such as gum tragacanth.

As compared with the known cables, the cable according to the invention has the following advantages:

The manufacture does not present special difficulties because the material sealing off against water is not hygroscopic and does not react with moist air. The materials may be obtained as free-flowing powders which do not cause allergic reactions even in case of long-time contact. Possible stains in clothing caused by the material as such or after contact with water can easily be washed away with water. Many complete safe combinations of materials are possible with which upon reaction in water uninflammable gases such as carbon dioxide, sulphur dioxide or nitrogen are obtained.

Mixtures which comprise between 20 and 80 percent by weight of the mixture if materials forming a gas in contact with water, the remainder being a high polymeric organic material swelling in water, have been found to be suitable for cables according to the invention.

However, optimum results are obtained with materials which comprise between 40 and 60 percent by weight of the mixture of materials forming a gas in contact with water, the remainder being a high polymeric organic material swelling in water.

The invention will now be described in greater detail with reference to the accompanying drawing and some embodiments.

The sole FIGURE diagrammatically shows a cross-section of a telecommunication cable consisting of three insulated conductor quads 1, 2 and 3, and a sheath 4. The insulation sheath 5 of the wires associated with one and the same quad are shaded in the same manner. The free spaces between the quads, for example at 6, 7 and 8, accommodate a material which in contact with water forms a gas and swells, and the gel then formed is also pressed into the free spaces between the quads, for example, 9 and 10 in quad 3, so that a sufficient sealing from water is obtained. If the water-sealing material is provided over the entire length of the cable in such a manner that approximately 50 percent of the free space in the cable is filled with the material the water can penetrate the cable only over a distance of some metres from a leakage in the cable sheath under a pressure of a water column of one metre.

EXAMPLE I

In a telecommunication cable consisting of 6 insulate conductor quads located within a cable sheath 40 percent of the free space was filled over its entire length with a mixture consisting of 50 percent by weight of methoxy cellulose (Tylose 444) and 50 percent by weight of a stoichiometric mixture of citric acid and calcium carbonate. An aperture having a diameter of 1 cm was provided in the cable sheath. Under a water pressure of a metre water column it was found that water had penetrated the cable over a distance of 300 cms from the centre of the aperture after 24 hours. It may be expected that when the cable is buried, the maximum water pressure which may be expected under normal circumstances will not be greater than approximately 1 metre.

EXAMPLE II

In order to investigate the water-sealing capacity of the materials to be used in the cable, the following comparative tests were performed.
Glass tubes having a length of 25 cms and a diameter of 1 cm were closed at one end by means of a plug of filtering paper. A water-sealing material was introduced into the tubes up to a height of 5 cms above the plug. Water was poured onto this material up to 15 cms above the material. Measurement of the distance of penetration by the water into the material was effected after 24 hours. The following results were obtained:
a. For a mixture consisting of 6.2 parts by weight of methoxy-cellulose (Tylose CR 1,500) and 3.8 parts by weight of a mixture forming a gas when in contact with water and being obtained by mixing 7 parts by weight of $NaNO_2$ with 12 parts by weight of succinic acid the distance of penetration by the water after 24 hours was 4 cms.
b. For a mixture consisting of 4.2 parts by weight of dextrine (Electrocol 70) and 5.8 parts by weight of the gas-forming mixture of $NaNO_2$ and succinic acid mentioned under (a) this distance was 1.5 cms.
c. For a mixture consisting of 2 parts by weight of methoxy-cellulose (Tylose 444) and 8 parts by weight of the gas-forming mixture of $NaNO_2$ and succinic acid mentioned under (a) this distance was 2 cms.
d. For a mixture consisting of 5 parts by weight of methoxy-cellulose (Tylose 444) and 5 parts by weight of a mixture forming a gas when in contact with water and consisting of 3 parts by weight of calcium carbonate and 4 parts by weight of citric acid ($C_6O_7H_8 \cdot \frac{1}{2} H_2O$) this distance was 2 cms.
e. For a mixture consisting of 5 parts by weight of methoxy-cellulose (Tylose 444) and 5 parts by weight of a mixture forming a gas when in contact with water and consisting of 5 parts by weight of calcium carbonate and 6.3 parts by weight of oxalic acid ($HO_2C \cdot CO_2H \cdot 2H_2O$) this distance was 2 cms.
f. For a mixture consisting of 5 parts by weight of methoxy-cellulose (Tylose 444) and 5 parts by weight of a mixture forming a gas when in contact with water and consisting of 10 parts by weight of calcium carbonate and 19.2 parts by weight of aminosulphonic acid this distance likewise was 2 cms. The mixtures were obtained by mixing the said components in a dry condition. (Tylose 444 and Tylose CR 1500 are products of the firm of Kalle AG, Germany; Electrocol 70 is a product of the firm N. V. Scholten, The Netherlands).

What is claimed is:

1. A cable self-sealing upon penetration by water, comprising one or more insulated conductors located within a sheath, said cable accommodating a material which in contact with water swells and evolves a gas, characterized in that the material sealing off the water penetration consists of a mixture of a high polymeric organic material capable of forming a gel with water and at least two non-hygroscopic materials at least one of which is soluble in water, which materials do not react when in a dry state but react when they contact water while forming a non-inflammable gas.

2. A cable self-sealing upon penetration by water as claimed in claim 1, characterized in that the mixture of materials forming a non-inflammable gas by chemical reation in contact with water comprises a non-hydgroscopic solid acid which is soluble in water and a salt of an acid of a volatile anhydride.

3. A cable self-sealing upon penetration by water as claimed in claim 1, characterized in that the mixture of materials forming a non-inflammable gas when in contact with water comprises at least one material from the group formed by citric acid, oxalic acid, amidosulphonic acid, succinic acid, glutaric acid, maleic acid and benzoic acid and a material from the group formed by the solid non-hygroscopic carbonates, sulphites and nitrites.

4. A cable self-sealing upon penetration by water as claimed in claim 1, characterized in that the mixture forming a non-inflammable gas and swelling when in contact with water comprises 20 to 80 percent by weight and preferably 40 to 60 percent by weight of a swelling material, remainder a mixture of materials forming a non-inflammable gas when in contact with water.

* * * * *